United States Patent
Ionescu et al.

(10) Patent No.: US 12,377,604 B2
(45) Date of Patent: Aug. 5, 2025

(54) THREE-DIMENSIONAL PRINTING WITH HIGH DENSITY NANOPARTICLES

(71) Applicant: PERIDOT PRINT LLC, Palo Alto, CA (US)

(72) Inventors: Robert Ionescu, Palo Alto, CA (US); James William Stasiak, Corvallis, OR (US); Garry Hinch, Corvallis, CA (US)

(73) Assignee: Peridot Print LLC, Palo Alto, CA (US)

( * ) Notice: Subject to any disclaimer, the term of this patent is extended or adjusted under 35 U.S.C. 154(b) by 477 days.

(21) Appl. No.: 17/417,075

(22) PCT Filed: Aug. 12, 2019

(86) PCT No.: PCT/US2019/046205
§ 371 (c)(1),
(2) Date: Jun. 21, 2021

(87) PCT Pub. No.: WO2021/029870
PCT Pub. Date: Feb. 18, 2021

(65) Prior Publication Data
US 2022/0168952 A1 Jun. 2, 2022

(51) Int. Cl.
*B29C 64/165* (2017.01)
*B29C 64/112* (2017.01)
(Continued)

(52) U.S. Cl.
CPC .......... *B29C 64/165* (2017.08); *B29C 64/336* (2017.08); *B33Y 10/00* (2014.12);
(Continued)

(58) Field of Classification Search
CPC .......... B22F 10/28; B22F 12/41; B22F 12/55; B22F 2999/00; B22F 3/1003; B22F 10/10;
(Continued)

(56) References Cited

U.S. PATENT DOCUMENTS

| 7,683,107 B2 | 3/2010 | Yang |
| 7,732,002 B2 | 6/2010 | Kodas et al. |

(Continued)

FOREIGN PATENT DOCUMENTS

| JP | 2017071518 A | 4/2017 | |
| WO | WO-2009017648 A1 * | 2/2009 | ............. C09D 11/30 |

(Continued)

OTHER PUBLICATIONS

Bai et al. English for document. (Year: 2009).*
(Continued)

*Primary Examiner* — Jeffrey M Wollschlager
*Assistant Examiner* — Edgaredmanuel Troche
(74) *Attorney, Agent, or Firm* — Dierker & Kavanaugh, P.C.

(57) ABSTRACT

A multi-fluid kit for three-dimensional printing can include a fusing agent and a nanoparticle-containing agent. The fusing agent can include water and a radiation absorber, where the radiation absorber absorbs radiation energy and converts the radiation energy to heat. The nanoparticle-containing agent can include a liquid vehicle, high density nanoparticles, and a nanoparticle suspension compound selected from the group consisting of terpineol, ethyl cellulose, and a combination thereof.

10 Claims, 4 Drawing Sheets

(51) Int. Cl.
    *B29C 64/336*     (2017.01)
    *B33Y 10/00*     (2015.01)
    *B33Y 30/00*     (2015.01)
    *B33Y 70/10*     (2020.01)
    *B82Y 30/00*     (2011.01)
    *B82Y 40/00*     (2011.01)
    *C01G 23/00*     (2006.01)

(52) U.S. Cl.
    CPC ............... *B33Y 30/00* (2014.12); *B33Y 70/10* (2020.01); *C01G 23/006* (2013.01); *B29C 64/112* (2017.08); *B82Y 30/00* (2013.01); *B82Y 40/00* (2013.01); *C01P 2004/64* (2013.01)

(58) Field of Classification Search
    CPC ..... B22F 12/90; B29C 64/112; B29C 64/135; B29C 64/165; B33Y 10/00; B33Y 30/00; B33Y 70/00; C09D 11/322; C04B 2111/00181; B28B 1/001; C01P 2004/64
    See application file for complete search history.

(56) References Cited

U.S. PATENT DOCUMENTS

| | | | |
|---|---|---|---|
| 8,133,535 | B2 | 3/2012 | Furuhata et al. |
| 9,023,930 | B2 | 5/2015 | Ootsuki |
| 9,056,801 | B2 | 6/2015 | Ootsuki et al. |
| 2005/0173680 | A1 | 8/2005 | Yang |
| 2018/0147777 | A1* | 5/2018 | Abbott, Jr. ............. B33Y 70/00 |
| 2019/0054524 | A1 | 2/2019 | Okada et al. |
| 2021/0283834 | A1* | 9/2021 | Van Brocklin ....... B29C 64/165 |

FOREIGN PATENT DOCUMENTS

| | | |
|---|---|---|
| WO | 2017/189306 A1 | 11/2017 |
| WO | 2017/213666 A1 | 12/2017 |
| WO | WO-2018022051 A1 * | 2/2018 ........... B29C 64/165 |

OTHER PUBLICATIONS

Ligon et al., "Polymers for 3D Printing and Customized Additive Manufacturing", Jul. 30, 2017, Chem. Rev. 2017, 117, 10212-10290, pp. 10243-10244 (Year: 2017).*
Aluminium Oxide Nanopowder density, US Research Nanomaterial, Inc (Year: 2020).*
Zirconium Nanoparticles, American Elements (Year: 2020).*
Iron(II, III) Oxide Nanoparticles, American Elements (Year: 2017).*
Titanium(IV) oxide, rutile nanopowder, Sigma-Aldrich (Year: 2022).*
Non-patent literature "Barium titanate(IV) material properties," Sigma-Aldrich; Retreived from https://www.sigmaaldrich.com/US/en/product/aldrich/208108 (Year: 2024).*

* cited by examiner

THREE-DIMENSIONAL PRINTING WITH HIGH DENSITY NANOPARTICLES

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Accordingly, it can be difficult to 3D print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

Figure 1:
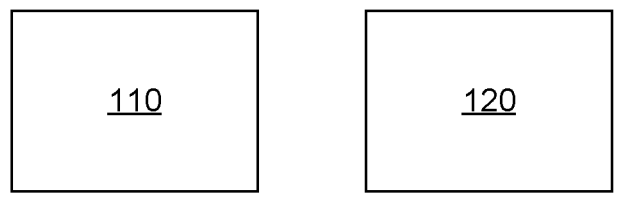
FIG. 1 is a schematic view of an example multi-fluid kit for three-dimensional printing in accordance with examples of the present disclosure.

The present disclosure describes multi-fluid kits for three-dimensional printing, three-dimensional printing kits, and methods of making three-dimensional printed articles. In one example, a multi-fluid kit for three-dimensional printing can include a fusing agent and a nanoparticle-containing agent. The fusing agent can include water and a radiation absorber, wherein the radiation absorber absorbs radiation energy and converts the radiation energy to heat. The nanoparticle-containing agent can include a liquid vehicle, high density nanoparticles, and a nanoparticle suspension compound selected from the group consisting of terpineol, ethyl cellulose, and a combination thereof. In some examples, the high density nanoparticles can have a density from about 4 g/cm$^3$ to about 12 g/cm$^3$. In further examples, the high density nanoparticles can be unfunctionalized. In certain examples, the high density nanoparticles can include a metal oxide. In still further examples, the high density nanoparticles can include barium titanate. In other examples, wherein the high density nanoparticles can be present in an amount from about 1 wt % to about 20 wt % with respect to a total weight of the nanoparticle-containing agent. In still other examples, the nanoparticle-containing agent can include the nanoparticle suspension compound in an amount from about 2 wt % to about 20 wt % with respect to a total weight of the nanoparticle-containing agent.

The present disclosure also describes three-dimensional printing kits. In one example, a three-dimensional printing kit can include a powder bed material and a nanoparticle-containing agent to selectively apply to the powder bed material. The powder bed material can include polymer particles. The nanoparticle-containing agent can include a liquid vehicle, high density nanoparticles, and a nanoparticle suspension compound selected from the group consisting of terpineol, ethyl cellulose, and a combination thereof. In some examples, the three-dimensional printing kit can also include a fusing agent to selectively apply to the powder bed material. The fusing agent can include water and a radiation absorber, wherein the radiation absorber absorbs radiation energy and converts the radiation energy to heat. In certain examples, the polymer particles can include polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoroide-trifluoroethylene-chlorotrifluoroethylene), wax, or a combination thereof. In further examples, the high density nanoparticles can have a density from about 4 g/cm$^3$ to about 12 g/cm$^3$. In other examples, the high density nanoparticles can be present in an amount from about 1 wt % to about 20 wt % with respect to the total weight of the nanoparticle-containing agent, and the nanoparticle-containing agent can include the nanoparticle suspension compound in an amount from about 2 wt % to about 20 wt % with respect to a total weight of the nanoparticle-containing agent.

The present disclosure also describes methods of making three-dimensional printed articles. In one example, a method of making a three-dimensional printed article can include iteratively applying individual build material layers of polymer particles to a powder bed. A fusing agent can be selectively applied onto the individual build material layers based on a three-dimensional object model. The fusing agent can include water and a radiation absorber. A nanoparticle-containing agent can also be selectively applied onto the individual build material layers based on the three-dimensional object model. The nanoparticle-containing agent can include a liquid vehicle, high density nanoparticles having a density from about 4 g/cm$^3$ to about 12 g/cm$^3$, and a nanoparticle suspension compound selected from the group consisting of terpineol, ethyl cellulose, and a combination thereof. The powder bed can be exposed to energy to selectively fuse the polymer particles in contact with the radiation absorber to form a fused polymer matrix at individual build material layers. In some examples, the high density nanoparticles can be unfunctionalized. In further examples, the high density nanoparticles can be present in an amount from about 1 wt % to about 20 wt % with respect to a total weight of the nanoparticle-containing agent, and the nanoparticle-containing agent can include the nanoparticle suspension compound in an amount from about 2 wt % to about 20 wt % with respect to a total weight of the nanoparticle-containing agent.

The multi-fluid kits, three-dimensional printing kits, and methods described herein can be used to make three-dimensional printed articles that incorporate various types of high density nanoparticles. Certain three-dimensional (3D) printing processes can involve fusing layers of polymer powder to form solid layers of a 3D printed article. In one process, a fusing agent can be jetted onto a powder bed of polymer particles. The fusing agent can include a radiation absorber, which can be a material that absorbs radiant energy and converts the energy to heat. Radiant energy can be applied to the powder bed to heat and fuse the polymer particles on which the fusing agent was applied. In some cases, nanoparticles can be added to the fusing agent or as a part of another jettable fluid agent. It can be useful to selectively incorporate these nanoparticles into the 3D printed article in order to impart properties of the nanoparticles to the 3D printed article. For example, different types of nanoparticles may be used in the 3D printed articles to give the 3D printed articles a particular color, density, electrical conductivity, dielectric constant, magnetic properties, or other properties. Many types of nanoparticles have a high density, such as from about 4 g/cm$^3$ to about 12 g/cm$^3$. These high density nanoparticles can be difficult to disperse in fluid agents because the nanoparticles are heavy and settle quickly out of the fluid. Barium titanate (BaTiO$_3$) is one particular nanoparticle material that has a high density of over 6 g/cm$^3$ and which can be difficult to disperse in jettable fluid agents for use in the 3D printing methods described herein.

In certain examples, the 3D printing methods described herein can involve jetting the fusing agent onto a powder bed using a fluid ejector such as a thermal inkjet system. This type of fluid ejector can be sensitive to agglomeration of solid particles in the fluid agents being jetted. For example, a fluid that includes water and barium titanate nanoparticles with an average diameter of 50 nanometers can be jetted for a short time using a thermal inkjet system, but after a few seconds the fluid stops jetting because agglomeration of the barium titanate particles. The agglomerated particles can clog the nozzle of the thermal inkjet system.

The multi-fluid kits, three-dimensional printing kits, and methods described herein include fluid agents that have high density nanoparticles suspended in the fluid agents with a nanoparticle suspension compound. Specifically, the nanoparticle suspension compound can be terpineol, ethyl cellulose, or a combination thereof. When terpineol or ethyl cellulose is included in the fluid agent with the high density nanoparticles, the high density nanoparticles can remain suspended for a much longer period of time. As a result, the fluid agent can be jetted using a fluid ejector such as an inkjet printhead without issues caused by agglomeration or settling of the nanoparticles. This can allow a wide variety of high density nanoparticles to be used in the 3D printing processes described herein in order to impart a variety of properties to 3D printed articles.

As an alternative method for suspending high density nanoparticles in fluid agents, in some cases the high density nanoparticles are functionalized with functional groups that can help disperse the high density nanoparticles in a fluid. However, the functionalization of the nanoparticles can often be an expensive and complex process. In contrast, the materials and methods described herein can include unfunctionalized, or "bare," nanoparticles. Even though the high density nanoparticles may not be functionalized with dispersing groups, the high density nanoparticles can still remain suspended in the fluid agents when terpineol or ethyl cellulose is also included in the fluid agents.

Multi-Fluid Kits for Three-Dimensional Printing

With this description in mind, FIG. 1 shows a schematic of an example multi-fluid kit for three-dimensional printing 100. The kit includes a fusing agent 110 and a nanoparticle-containing agent 120. The fusing agent can include water and a radiation absorber. The radiation absorber can absorb radiation energy and convert the radiation energy to heat. The nanoparticle-containing agent can include a liquid vehicle, high density nanoparticles, and a nanoparticle suspension compound. The nanoparticle suspension compound can be terpineol, ethyl cellulose, or a combination thereof.

As used herein, "terpineol" refers to a monoterpene alcohol that can also be referred to as "2-(4-Methylcyclohex-3-en-1-yl)propan-2-ol." Terpineol can have four different isomers, with the following chemical structures:

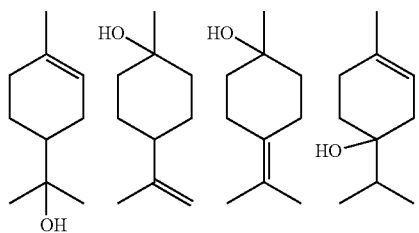

In some examples, terpineol used in the nanoparticle-containing agent can include one of the above isomers, or a mixture of two or more of the above isomers. In one example, the terpineol can include a mixture of all four isomers with the first isomer (alpha-terpineol) being the most abundant.

As used herein, "ethyl cellulose" refers to a derivative of cellulose in which some of the hydroxyl groups of the repeating glucose units of the cellulose are converted to ethyl ether groups. Ethyl cellulose can have the following chemical structure:

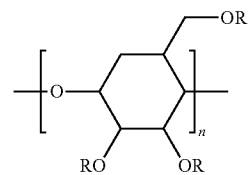

where R can independently be either hydrogen or an ethyl group and n can be an integer from about 5 to about 3,000. The ratio of hydrogen to ethyl in the R groups can be from about 100:1 to about 1:100. In certain examples, the R groups can include from about 1% to about 10% hydrogen by weight, with the remainder being ethyl groups. In other examples, the R groups can include from about 1% to about 10% ethyl groups by weight, with the remainder being hydrogen. The molecular weight of the ethyl cellulose can range from about 1,000 Mw to about 500,000 Mw in some examples.

In some examples, the multi-fluid kit can also include a detailing agent. The detailing agent can include a detailing compound, which is a compound that can reduce the temperature of powder bed material onto which the detailing agent is applied. In some examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused.

Three-Dimensional Printing Kits

Figure 2:
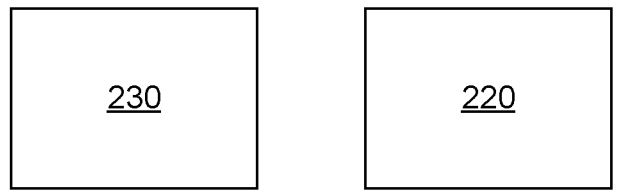
FIG. 2 is a schematic view of an example three-dimensional printing kit in accordance with examples of the present disclosure.

The present disclosure also describes three-dimensional printing kits. In some examples, the three-dimensional printing kits can include materials that can be used in the three-dimensional printing processes described herein. FIG. 2 shows a schematic illustration of one example three-dimensional printing kit 200 in accordance with examples of the present disclosure. The kit includes a powder bed material 230 including polymer particles and a nanoparticle-containing agent 220 to selectively apply to the powder bed material. The nanoparticle-containing agent can include a liquid vehicle, high density nanoparticles, and a nanoparticle suspension compound. The nanoparticle suspension compound can be terpineol, ethyl cellulose, or a combination thereof.

Figure 3:
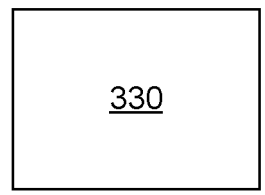
FIG. 3 is a schematic view of another example three-dimensional printing kit in accordance with examples of the present disclosure.
Figure 3:
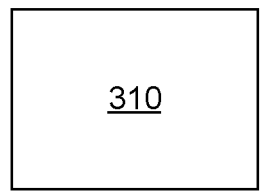
Figure 3:

In further examples, a three-dimensional printing kit can include multiple fluid agents, such as any combination of a fusing agent, a detailing agent, and a nanoparticle-containing agent. FIG. 3 is a schematic illustration of one example three-dimensional printing kit 300 that includes a powder bed material 330, a fusing agent 310, and a nanoparticle-containing agent 320. The fusing agent can include water and a radiation absorber that absorbs radiation energy and converts the radiation energy to heat. The nanoparticle-containing agent can include a liquid vehicle, high density nanoparticles, and a nanoparticle suspension compound that is terpineol, ethyl cellulose, or a combination thereof.

While the fusing agent and the nanoparticle-containing agent can be two separate fluid agents in some examples, in other examples the nanoparticle-containing agent can include a radiation absorber so that the nanoparticle-containing agent can function as a fusing agent. Thus, in some examples, the three-dimensional printing kit can include a nanoparticle-containing agent that can also function as a fusing agent, and no separate fusing agent may be included in the kit. In certain examples, the high density nanoparticles themselves can absorb radiation and convert the radiation energy to heat. Thus, the high density nanoparticles may perform the function of the radiation absorber or contribute to the radiation absorbance of the nanoparticle-containing agent. In other examples, the nanoparticle-containing agent can include a radiation absorber that is separate from and in addition to the high density nanoparticles.

Figure 4:
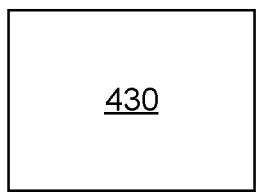
FIG. 4 is a schematic view of yet another example three-dimensional printing kit in accordance with examples of the present disclosure.
Figure 4:
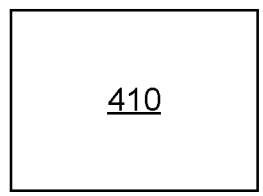
Figure 4:
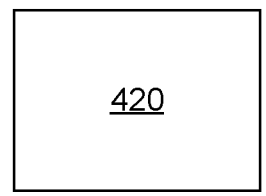
Figure 4:
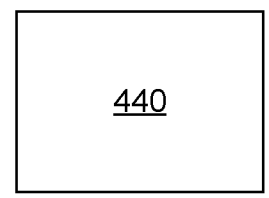

FIG. 4 is a schematic illustration of yet another example three-dimensional printing kit 400 that includes a powder bed material 430, a fusing agent 410, a nanoparticle-containing agent 420, and a detailing agent 440. The fusing agent, nanoparticle-containing agent, and detailing agent can include the ingredients described above.

Figure 5A:
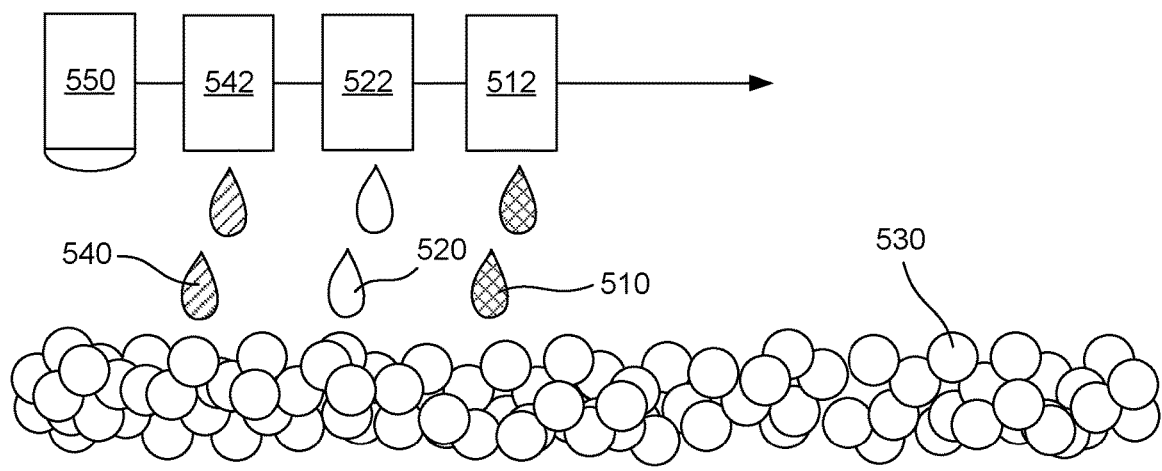
FIGS. 5A-5C show a schematic view of an example three-dimensional printing process using an example three-dimensional printing kit in accordance with examples of the present disclosure.
Figure 5B:
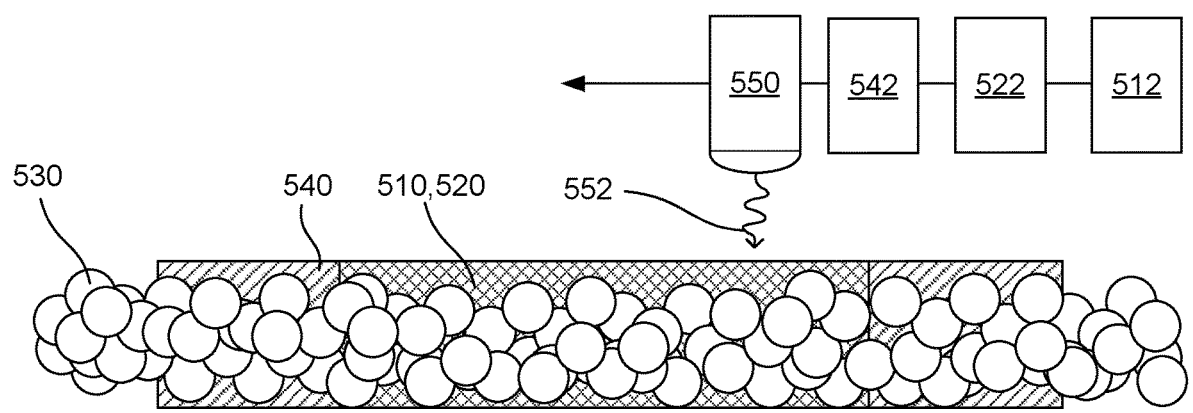
Figure 5C:
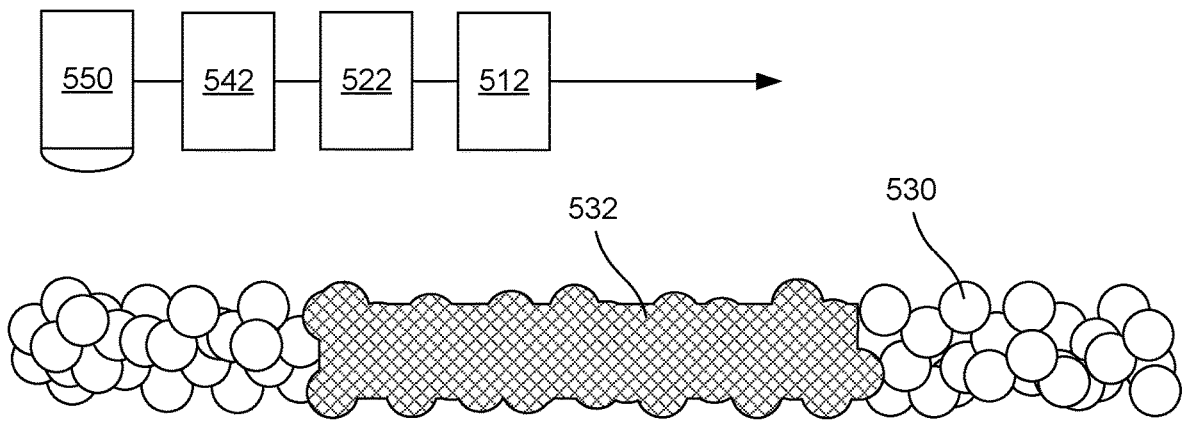

To illustrate the use of the three-dimensional printing kits and multi-fluid kits described herein, FIGS. 5A-5C illustrate one example of using a three-dimensional printing kit to form a 3D printed article. In FIG. 5A, a fusing agent 510, a nanoparticle-containing agent 520, and a detailing agent 540 are jetted onto a layer of powder bed material 530. The fusing agent is jetted from a fusing agent ejector 512, the nanoparticle-containing agent is jetted from a nanoparticle-containing agent ejector 522, and the detailing agent is jetted from a detailing agent ejector 542. These fluid ejectors can move across the layer of powder bed material to selectively jet fusing agent on areas that are to be fused, while the detailing agent can be jetted onto areas that are to be cooled. The nanoparticle-containing agent can be jetted in areas where the high density nanoparticles are desired. A radiation source 550 can also move across the layer of powder bed material.

FIG. 5B shows the layer of powder bed material 530 after the fusing agent 510 and the nanoparticle-containing agent 520 have been jetted onto an area of the layer that is to be fused. Additionally, the detailing agent 540 has been jetted onto areas adjacent to the edges of the area to be fused. In this figure, the radiation source 550 is shown emitting radiation 552 toward the layer of polymer particles. The fusing agent can include a radiation absorber that can absorb this radiation and convert the radiation energy to heat.

FIG. 5C shows the layer of powder bed material 530 with a fused portion 532 where the fusing agent was jetted. This portion has reached a sufficient temperature to fuse the polymer particles together to form a solid polymer matrix. This portion can also include high density nanoparticles from the nanoparticle-containing agent, which was also jetted in the same area as the fusing agent. The area where the detailing agent was jetted remains as loose polymer particles.

In various examples, the nanoparticle-containing agent can be jetted onto portions of the individual powder bed material layers to form a portion of the final 3D printed article that has the high density nanoparticles embedded in the fused polymer matrix. In some examples, the nanoparticle-containing agent can be jetted in all the same areas where the fusing agent is jetted (or the nanoparticle-containing agent may be used as the fusing agent in some cases, as mentioned above) and the resulting 3D printed article can have the high density nanoparticles distributed throughout the entire article. In other examples, the nanoparticle-containing agent may be selectively jetted in some areas and not in other areas where the fusing agent was jetted. This can result in a 3D printed article that has some portions without high density nanoparticles and some portions with high density nanoparticles. Thus, the particular property that is imparted by the high density nanoparticles can be present throughout the entire 3D printed article or in certain portions of the 3D printed article.

Powder Bed Materials

In certain examples, the powder bed material can include polymer particles having a variety of shapes, such as substantially spherical particles or irregularly-shaped particles. In some examples, the polymer powder can be capable of being formed into 3D printed objects with a resolution of about 20 μm to about 100 μm, about 30 μm to about 90 μm, or about 40 μm to about 80 μm. As used herein, "resolution" refers to the size of the smallest feature that can be formed on a 3D printed object. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm or from 40 μm to about 80 μm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6/6 powder, polyamide 6/12 powder, thermoplastic polyamide powder, polyamide copolymer powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be polyamide 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The multi-fluid kits and three-dimensional printing kits described herein can include a fusing agent to be applied to the polymer build material. The fusing agent can include a radiation absorber that can absorb radiant energy and convert the energy to heat. In certain examples, the fusing agent can be used with a powder bed material in a particular 3D printing process. A thin layer of powder bed material can be formed, and then the fusing agent can be selectively applied to areas of the powder bed material that are desired to be consolidated to become part of the solid 3D printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final 3D printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the 3D printing system. Generally, the print mode can include any variables or parameters that can be controlled during 3D printing to affect the outcome of the 3D printing process.

Generally, the process of forming a single layer by applying fusing agent and irradiating the powder bed can be repeated with additional layers of fresh powder bed material to form additional layers of the 3D printed article, thereby building up the final object one layer at a time. In this process, the powder bed material surrounding the 3D printed article can act as a support material for the object. When the 3D printing is complete, the article can be removed from the powder bed and any loose powder on the article can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_5$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

In further examples, the radiation absorber can include a tungsten bronze or a molybdenum bronze. In certain examples, tungsten bronzes can include compounds having the formula $M_xWO_3$, where M is a metal other than tungsten and x is equal to or less than 1. Similarly, in some examples, molybdenum bronzes can include compounds having the formula $M_xMoO_3$, where M is a metal other than molybdenum and x is equal to or less than 1.

In alternative examples, the radiation absorber can preferentially absorb ultraviolet radiation. In some examples, the radiation absorber can absorb radiation in wavelength range from about 300 nm to about 400 nm. In certain examples, the amount of electromagnetic energy absorbed by the fusing agent can be quantified as follows: a layer of the fusing agent having a thickness of 0.5 μm after liquid components have been removed can absorb from 90% to 100% of radiant electromagnetic energy having a wavelength within a wavelength range from about 300 nm to about 400 nm. The radiation absorber may also absorb little or no visible light, thus making the radiation absorber transparent to visible light. In certain examples, the 0.5 μm layer of the fusing agent can absorb from 0% to 20% of radiant electromagnetic energy in a wavelength range from above about 400 nm to about 700 nm. Non-limiting examples of ultraviolet absorbing radiation absorbers can include nanoparticles of titanium dioxide, zinc oxide, cerium oxide, indium tin oxide, or a combination thereof. In some examples, the nanoparticles can have an average particle size from about 2 nm to about 300 nm, from about 10 nm to about 100 nm, or from about 10 nm to about 60 nm.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

As mentioned above, in some examples, the fusing agent can include the high density nanoparticles described herein. Thus, in some cases the fusing agent and the nanoparticle-containing agent can be one and the same. The fusing agent can include the high density nanoparticles in an amount from about 1 wt % to about 20 wt % with respect to the total weight of the fusing agent, in some examples. In other examples, the fusing agent can include the high density nanoparticles in an amount from about 1 wt % to about 10 wt % or from about 1 wt % to about 8 wt %.

In certain further examples, the fusing agent can include from about 5 wt % to about 40 wt % organic co-solvent, from about 0 wt % to about 20 wt % high boiling point solvent, from about 0.1 wt % to about 1 wt % surfactant, from about 0.1 wt % to about 1 wt % anti-kogation agent, from about 0.01 wt % to about 1 wt % chelating agent, from about 0.01 wt % to about 1 wt % biocide, and from about 1 wt % to about 10 wt % carbon black pigment. The balance can be deionized water.

Nanoparticle-Containing Agents

In some examples, the multi-fluid kits or three-dimensional printing kits can include a nanoparticle-containing agent. Generally, the nanoparticle-containing agent can include high density nanoparticles suspended in a liquid vehicle. The high density nanoparticles, which may normally be difficult to suspend, can be suspended by including a nanoparticle suspension compound in the nanoparticle-containing agent. The nanoparticle suspension compound can be terpineol, ethyl cellulose, or a combination thereof.

As used herein, "high density" can refer to nanoparticles having a density that is significantly greater than the liquid vehicle in which the nanoparticles are suspended, to the point that the nanoparticles are difficult to suspend and settle out of suspension quickly without the use of the nanoparticle suspension compound. In some examples, the high density nanoparticles can have a density from about 4 $g/cm^3$ to about 12 $g/cm^3$. In further examples, the high density nanoparticles can have a density from about 5 $g/cm^3$ to about 10 $g/cm^3$. In still further examples, the high density nanoparticles can have a density that is from about 4 to about 15 times the density of the liquid vehicle in which the high density nanoparticles are suspended.

The high density nanoparticles can include a variety of materials. In some examples, the high density nanoparticles can be metal nanoparticles. Non-limiting examples can include silver, gold, platinum, palladium, rhodium, iridium, iron, titanium, and combinations thereof. In other examples, the high density nanoparticles can be metal oxide nanoparticles. Examples of metal oxide nanoparticles can include nanoparticles of titanium dioxide, barium titanate, iron oxide, aluminum oxide, zinc oxide, nickel oxide, manganese oxide, molybdenum oxide, cobalt oxide, tungsten oxide, chromium oxide, mixed metal oxides thereof, and combinations thereof. In a particular example, the high density nanoparticles can include barium titanate. Other inorganic nanoparticles can also be used, such as silicon nanoparticles, silicone oxide nanoparticles, and so on.

In some examples, the high density nanoparticles can be bare nanoparticles, meaning that the nanoparticles are not functionalized with functional groups on the surfaces of the nanoparticles. In some cases, the high density nanoparticles can be completely bare, without any functionalizing groups. In other cases, the nanoparticles may include surface functional groups, but the functional groups may not increase dispersibility of the nanoparticles in the liquid vehicle. In alternative examples, the high density nanoparticles can include dispersibility-enhancing functional groups attached to the surfaces of the nanoparticles. In such examples, the nanoparticle suspension compound in the nanoparticle-containing agent and the dispersibility-enhancing functional groups can both contribute to the dispersibility of the high density nanoparticles.

In further examples, the high density nanoparticles can be included in the nanoparticle-containing agent in an amount from about 1 wt % to about 20 wt % with respect to the total weight of the nanoparticle-containing agent. In other examples, the nanoparticle-containing agent can include the high density nanoparticles in an amount from about 1 wt % to about 10 wt % or from about 1 wt % to about 8 wt %.

The average particle size of the high density nanoparticles can generally be from about 1 nm to about 1,000 nm. In certain examples, the high density nanoparticles can have an average particle size from about 1 nm to about 200 nm, or from about 5 nm to about 100 nm, or from about 10 nm to about 60 nm.

The high density nanoparticles can have a variety of properties that may be imparted to 3D printed articles when the nanoparticle-containing agent is used as described herein. In some examples, the high density particles can have a particular color that is desired to be imparted to the 3D printed article. Such high density particles may include high density inorganic pigment particles of any color. In one such example, the nanoparticle-containing agent can function as a coloring agent that can be used to selectively print color in desired portions of the 3D printed article. Multiple such agents with differently colored pigments can potentially be used to print multi-color or full-color 3D printed articles. In other examples, the high density nanoparticles can be used simply to selectively adjust the density of portions of the 3D printed article. This can be done, for example, in order to balance a 3D printed article in a particular way. In further examples, the high density nanoparticles can be electrically conductive. The electrically conductive nanoparticle may be incorporated into portions of the 3D printed article to form conductive traces, vias, or other conductive features. In other examples, the high density nanoparticles can have a particular dielectric constant. For example, the high density nanoparticles may have a dielectric constant from about 1 to about 7,000. These nanoparticles can be incorporated into the 3D printed article to adjust the dielectric constant of the 3D printed article. Magnetic nanoparticles (i.e., ferromagnetic, ferrimagnetic, or superparamagnetic) can also be used to impart magnetic properties to the 3D printed article.

The nanoparticle-containing agent can include a liquid vehicle. The high density nanoparticles can be suspended in the liquid vehicle. The liquid vehicle can be aqueous or non-aqueous, in various examples. Aqueous liquid vehicles can include more than 50 wt % water and can include organic co-solvent in some cases. Non-aqueous liquid vehicles can be made up entirely of an organic solvent or multiple organic solvents. In one example, the liquid vehicle can be a non-aqueous liquid vehicle including n-butanol, ethanol, cyclohexanone, or a combination thereof.

As mentioned above, the nanoparticle-containing agent can include terpineol, ethyl cellulose, or a combination thereof as a nanoparticle suspension compound. These particular compounds can help suspend high density nanoparticle in the liquid vehicle. It has been found that high density nanoparticles, which would otherwise settle out of suspension quickly, can be held in suspension for long periods of time by including the nanoparticle suspension compound. In some examples, the nanoparticle suspension compound can be included in an amount from about 2 wt % to about 20 wt % with respect to the total weight of the nanoparticle-containing agent. In further examples, the nanoparticle suspension compound can be included in an amount from about 2 wt % to about 15 wt % of from about 2 wt % to about 10 wt %. In still further compounds, the weight ratio of nanoparticle suspension compound to high density nanoparticles can be from about 1:10 to about 20:1.

The nanoparticle-containing agent can also include ingredients to allow the nanoparticle-containing agent to be jetted by a fluid jet printhead. In some examples, the nanoparticle-containing agent can include jettability imparting ingredients such as those in the fusing agent described above. These ingredients can include a surfactant, dispersant, co-solvent, biocides, viscosity modifiers, materials for pH adjustment, sequestering agents, preservatives, and so on. These ingredients can be included in any of the amounts described above.

In certain examples, the nanoparticle-containing agent can include from about 1 wt % to about 10 wt % organic co-solvent, from about 1 wt % to about 20 wt % high boiling point solvent, from about 0.1 wt % to about 2 wt % surfactant, from about 0.1 wt % to about 5 wt % anti-kogation agent, from about 0.01 wt % to about 5 wt % chelating agent, from about 0.01 wt % to about 4 wt % biocide, and the balance can be deionized water.

Detailing Agents

In further examples, multi-fluid kits or three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

In certain examples, the detailing agent can include from about 1 wt % to about 10 wt % organic co-solvent, from about 1 wt % to about 20 wt % high boiling point solvent, from about 0.1 wt % to about 2 wt % surfactant, from about 0.1 wt % to about 5 wt % anti-kogation agent, from about 0.01 wt % to about 5 wt % chelating agent, from about 0.01 wt % to about 4 wt % biocide, and the balance can be deionized water.

Methods of Making 3D Printed Articles

Figure 6:
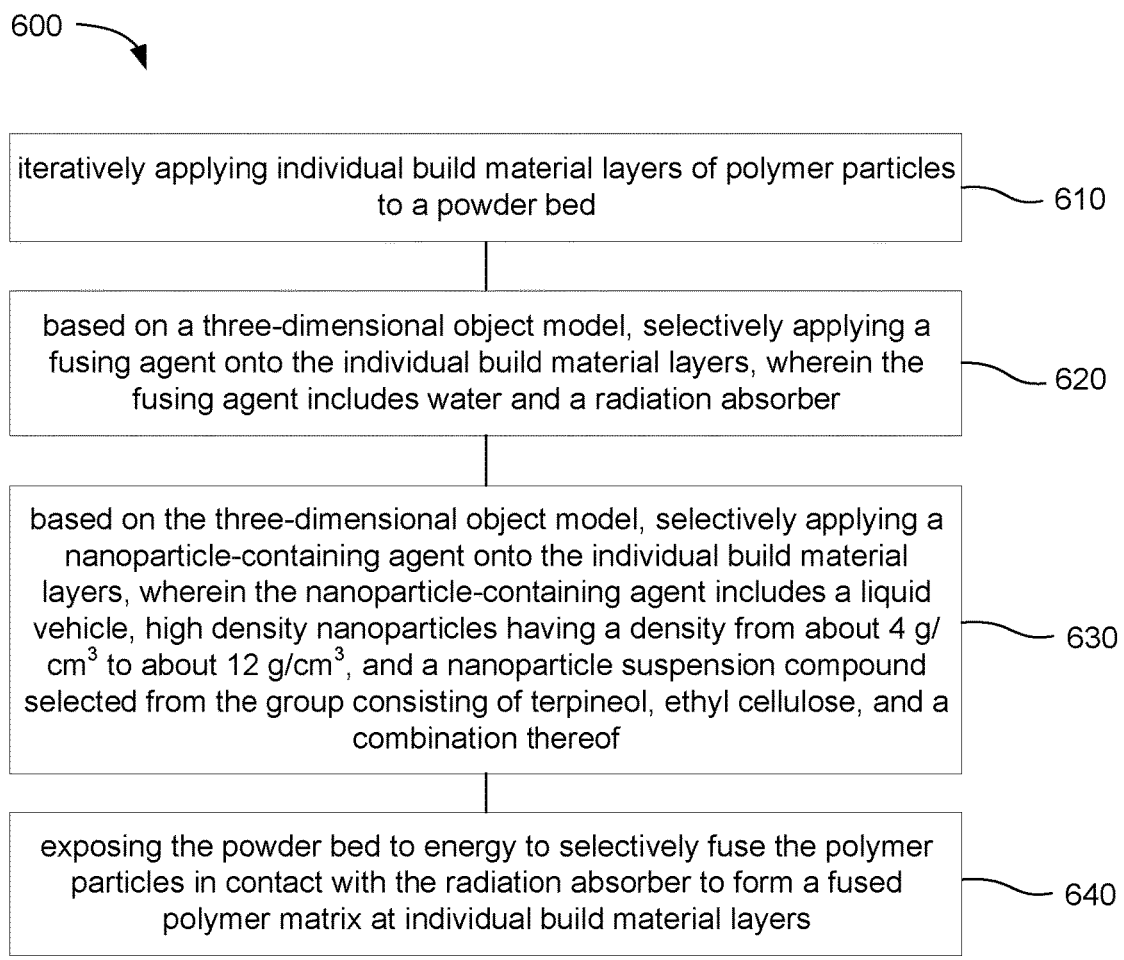
FIG. 6 is a flowchart illustrating an example method of making a three-dimensional printed article in accordance with examples of the present disclosure.

The present disclosure also describes methods of making three-dimensional printed articles. FIG. 6 shows a flowchart illustrating one example method 600 of making a three-dimensional printed article. The method includes: iteratively applying individual build material layers of polymer particles to a powder bed 610; based on a three-dimensional object model, selectively applying a fusing agent onto the individual build material layers, wherein the fusing agent includes water and a radiation absorber 620; based on the three-dimensional object model, selectively applying a nanoparticle-containing agent onto the individual build material layers, wherein the nanoparticle-containing agent includes a liquid vehicle, high density nanoparticles having a density from about 4 g/cm$^3$ to about 12 g/cm$^3$, and a nanoparticle suspension compound selected from the group consisting of terpineol, ethyl cellulose, and a combination thereof 630; and exposing the powder bed to energy to selectively fuse the polymer particles in contact with the radiation absorber to form a fused polymer matrix at individual build material layers 640.

In some examples, the nanoparticle-containing agent can be selectively jetted on certain areas of the powder bed where the property imparted by the high density nanoparticles is desired. As explained above, the high density nanoparticles can impart a variety of properties to the 3D printed article. These properties can be made uniform throughout the article by jetting the nanoparticle-containing agent throughout the entire article, or the nanoparticle-containing agent can be selectively jetted on certain portions to impart the property to certain portions of the 3D printed article.

The fusing agent, nanoparticle-containing agent, and detailing agent can be jetted onto the powder bed using fluid jet print heads. The amount of the fusing agent used can be calibrated based on the concentration of radiation absorber in the fusing agent, the level of fusing desired for the polymer particles, and other factors. In some examples, the amount of fusing agent printed can be sufficient to contact the radiation absorber with the entire layer of polymer powder. For example, if each layer of polymer powder is 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be polyamide 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure to coalesce each printed layer. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate each layer from about 0.5 to about 10 seconds per pass The 3D printed article can be formed by jetting a fusing agent onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article. In some examples, the 3D object model can also include a particular 3D portion of the object that is desired to include high density nanoparticles. Thus, this particular portion can define areas where the nanoparticle-containing agent will be jetted. Other information may also be included, such as structures to be formed of additional different materials or color data for printing the article with various colors at different locations on the article. The 3D object model may also include features or materials specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, concentration of the high density nanoparticles, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A fluid jet printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer.

After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe pigment colorants, and also other pigments such as organometallics, ferrites, ceramics, etc. In one specific aspect, however, the pigment is a pigment colorant.

As used herein, "applying" when referring to fusing agent and/or detailing, for example, refers to any technology that can be used to put or place the respect fluid agent on or into a layer of powder bed material for forming 3D articles. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezo architecture. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if each numerical value and sub-range is explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Barium Titanate Suspended with Terpineol

A sample nanoparticle-containing agent was made by suspending barium titanate ($BaTiO_3$) nanoparticles having an average particle size of 50 nm in n-butanol with terpineol. In various examples, the concentration of the nanoparticles may be from about 1 wt % to about 20 wt %. The concentration of the terpineol can be from about 2 wt % to about 20 wt %. The ingredients were mixed by sonication and stirring for 1 hour. This nanoparticle-containing agent was observed have a stable suspension for 3 days without any separation or settling of nanoparticles. The sample nanoparticle-containing agent was loaded into a thermal inkjet pen and test printed. The sample agent was able to be printed on paper successfully using the thermal inkjet pen without clogging.

The sample nanoparticle-containing agent was then loaded into an HP Multi-jet Fusion 3D™ test 3D printer. Four circular disks were formed using the test 3D printer. The polymer powder used in the test 3D printer was made up of polyamide 12 particles. A fusing agent including a carbon black pigment as a radiation absorber was used to fuse the polymer powder, and the sample nanoparticle-containing agent was jetted in the same areas where the fusing agent was jetted. The circular disks were successfully printed and the nanoparticle-containing agent was successfully jetted from the test 3D printer without clogging or other issues.

Example 2—Barium Titanate Suspended with Ethyl Cellulose

A second sample nanoparticle-containing agent was made by suspending 50 nm $BaTiO_3$ particles in cyclohexanone, ethanol, and ethyl cellulose. In various examples, the combined amount of cyclohexanone and ethanol can be from about 10 wt % to about 90 wt %, and the amount of ethyl cellulose can be from about 2 wt % to about 20 wt %. This sample agent was loaded into a thermal inkjet pen and test printed on a plastic surface. The sample agent was able to be printed using the thermal inkjet pen without clogging or other issues.

What is claimed is:

1. A multi-fluid kit for three-dimensional printing, comprising:
   a fusing agent comprising water and a radiation absorber, wherein the radiation absorber absorbs radiation energy and converts the radiation energy to heat; and
   a nanoparticle-containing agent consisting of:
      an organic solvent selected from the group consisting of i) n-butanol and ii) a combination of ethanol and cyclohexanone;
      barium titanate nanoparticles; and
      a nanoparticle suspension compound selected from the group consisting of terpineol, ethyl cellulose, and a combination thereof.

2. The multi-fluid kit of claim 1, wherein the barium titanate nanoparticles have a density from about 4 g/cm³ to about 12 g/cm³.

3. The multi-fluid kit of claim 1, wherein the barium titanate nanoparticles are unfunctionalized.

4. The multi-fluid kit of claim 1, wherein the barium titanate nanoparticles are present in an amount from about 1 wt % to about 20 wt % with respect to a total weight of the nanoparticle-containing agent.

5. The multi-fluid kit of claim 1, wherein the nanoparticle suspension compound is present in an amount from about 2 wt % to about 20 wt % with respect to a total weight of the nanoparticle-containing agent.

6. The multi-fluid kit of claim 1, wherein the nanoparticle-containing agent is free of a radiation absorber.

7. A three-dimensional printing kit, comprising:
   a powder bed material comprising polymer particles;
   a fusing agent to selectively apply to the powder bed material, the fusing agent comprising water and a radiation absorber, wherein the radiation absorber absorbs radiation energy and converts the radiation energy to heat; and
   a nanoparticle-containing agent to selectively apply to the powder bed material, the nanoparticle-containing agent consisting of:
      an organic solvent selected from the group consisting of i) n-butanol and ii) a combination of ethanol and cyclohexanone;
      barium titanate nanoparticles; and
      a nanoparticle suspension compound selected from the group consisting of terpineol, ethyl cellulose, and a combination thereof.

8. The three-dimensional printing kit of claim 7, wherein the polymer particles are selected from the group consisting of polyamide 6 particles, polyamide 9 particles, polyamide 11 particles, polyamide 12 particles, polyamide 66 particles, polyamide 612 particles, thermoplastic polyamide particles, polyamide copolymer particles, polyethylene particles, thermoplastic polyurethane particles, polypropylene particles, polyester particles, polycarbonate particles, polyether ketone particles, polyacrylate particles, polystyrene particles, polyvinylidene fluoride particles, polyvinylidene fluoride copolymer particles, poly(vinylidene fluoride-trifluoroethylene) particles, poly(vinylidene fluoroide-trifluoroethylene-chlorotrifluoroethylene) particles, wax particles, and a combination thereof.

9. The three-dimensional printing kit of claim 7, wherein the barium titanate nanoparticles have a density from about 4 g/cm³ to about 12 g/cm³.

10. The three-dimensional printing kit of claim 7, wherein the barium titanate nanoparticles are present in an amount from about 1 wt % to about 20 wt % with respect to the total weight of the nanoparticle-containing agent, and wherein the nanoparticle-containing agent includes the nanoparticle suspension compound in an amount from about 2 wt % to about 20 wt % with respect to a total weight of the nanoparticle-containing agent.

* * * * *